United States Patent
Mohan et al.

(10) Patent No.: US 6,664,478 B2
(45) Date of Patent: Dec. 16, 2003

(54) BUS BAR ASSEMBLY

(75) Inventors: David John Mohan, Lytham St Annes (GB); Mark Francis Smith, Preston (GB)

(73) Assignee: Tyco Electronics UK Ltd. (GB)

( * ) Notice: Subject to any disclaimer, the term of this patent is extended or adjusted under 35 U.S.C. 154(b) by 0 days.

(21) Appl. No.: 10/203,324
(22) PCT Filed: Feb. 9, 2001
(86) PCT No.: PCT/GB01/00545
  § 371 (c)(1),
  (2), (4) Date: Aug. 6, 2002
(87) PCT Pub. No.: WO01/59899
  PCT Pub. Date: Aug. 16, 2001

(65) Prior Publication Data
  US 2003/0000733 A1 Jan. 2, 2003

(30) Foreign Application Priority Data
  Feb. 12, 2000 (GB) .............................. 0003146

(51) Int. Cl.$^7$ ................................ H02G 5/00
(52) U.S. Cl. ............ 174/149 B; 174/68.2; 174/70 B; 264/263; 264/273; 264/274; 264/275; 361/611; 361/639; 361/658; 439/212
(58) Field of Search ............... 174/68.2, 70 B, 174/71 B, 72 B, 88 B, 99 B, 129 B, 149 B; 264/263, 267, 271.1, 273, 274, 275; 361/611, 624, 637, 639, 650, 658; 439/212

(56) References Cited

U.S. PATENT DOCUMENTS

| | | | |
|---|---|---|---|
| 2,310,919 A | | 2/1943 | Adam ........................ 174/99 |
| 2,318,859 A | * | 5/1943 | Huguelet ................... 248/68.1 |
| 2,445,463 A | * | 7/1948 | West ........................ 174/70 B |
| 2,914,708 A | * | 11/1959 | Edmunds .................... 361/634 |
| 3,383,458 A | * | 5/1968 | Raskhodoff et al. ...... 174/72 B |
| 4,025,826 A | * | 5/1977 | Wilson et al. ............. 361/624 |
| 4,281,602 A | * | 8/1981 | Lange ..................... 264/271.1 |
| 4,667,268 A | * | 5/1987 | Mrowka ..................... 361/634 |
| 4,822,951 A | * | 4/1989 | Wilson et al. ............. 174/68.2 |
| 5,274,528 A | * | 12/1993 | Noschese et al. ........... 361/642 |
| 5,527,502 A | | 6/1996 | Kiuchi et al. ............... 264/250 |
| 5,722,787 A | * | 3/1998 | Mazura et al. ............. 174/68.2 |
| 5,852,951 A | * | 12/1998 | Santi .......................... 74/443 |
| 6,019,928 A | * | 2/2000 | Fujitani et al. ............. 264/263 |
| 6,069,321 A | * | 5/2000 | Wagener et al. .......... 174/99 B |
| 6,099,975 A | * | 8/2000 | Peterson et al. ............ 428/596 |
| 6,471,900 B1 | * | 10/2002 | Sakai ........................ 264/263 |
| 6,552,273 B2 | * | 4/2003 | Shiro Nishida ......... 174/149 B |

FOREIGN PATENT DOCUMENTS

| | | |
|---|---|---|
| DE | 1 582 880 | 1/1981 |
| DE | 40 13 312 | 10/1991 |
| EP | 0 828 323 | 3/1998 |
| FR | 1017395 | 9/1952 |
| GB | 2 107 528 | 4/1983 |
| GB | 2 163 300 | 4/1984 |

OTHER PUBLICATIONS

Copy of PCT Search Report for PCT/GB01/00545.
Copy of International Preliminary Examination Report for PCT/GB01/00545.
Copy of UK Search Report for GB 0003146.8.

* cited by examiner

Primary Examiner—Dean A. Reichard
Assistant Examiner—Adolfo Nino
(74) Attorney, Agent, or Firm—Myers Bigel Sibley & Sajovec

(57) ABSTRACT

Support members for a busbar assembly are provided. The support members include a body formed of an electrically insulative material and at least one receiving formation in the body and configured to receive an electrical conductor. A strengthening insert is located substantially entirely within the body to electrically insulate the strengthening insert from the electrical conductor. The strengthening insert is a material different from the electrically insulative material of the body. Support structures and busbar assemblies and methods of making the support members are also provided.

29 Claims, 5 Drawing Sheets

BUS BAR ASSEMBLY

RELATED APPLICATIONS

The present application is a National Phase application of PCT/GB01/00545 filed on Feb. 9, 2001 and published in English, which claims priority from Application GB 0003146.8 filed on Feb. 12, 2000.

FIELD OF THE INVENTION

This invention relates to a busbar assembly, and includes a support member for a busbar assembly, a method of making a support member for a busbar assembly, a busbar assembly, and a support member and a spacer member for a busbar assembly.

BACKGROUND OF THE INVENTION

For many years, busbar assemblies have been used in a wide variety of domestic and industrial installations to provide a convenient means to supply relatively high electric currents, such assemblies not only being convenient from an electrical point of view, but also being relatively compact and easily accessible for maintenance purposes.

In view of the relatively high currents (up to 5000 amps, for example) which may be carried by the busbars, various electrical and safety considerations must be taken into account when designing and constructing supports for the current carrying conductors, to prevent cross induction, for example, and to ensure that the overall assembly is sufficiently robust to withstand large thermal and mechanical stresses which may be generated, for example, when short circuit faults occur.

Typically, a number of busbars are aligned generally parallel to each other, with the busbars being held in position by a number of busbar support members extending generally transverse to the axes of the busbars, with the support members being arranged in pairs, such that the busbars are in effect clamped between the upper and lower halves of each pair.

To avoid any risk of short circuits occurring, the supports are typically formed from a non-conductive material such as a thermo-plastics resin, and whilst such materials exhibit good insulating properties, their mechanical strength is often insufficient to withstand the thermal and mechanical stresses referred to above, and separate strengthening devices, typically in the form of metallic cross-braces, are required.

From a purely mechanical viewpoint, such devices operate satisfactorily, but it is necessary to position them extremely carefully to ensure that a safe minimum clearance is maintained between them and the live/earth inlet terminals to avoid any undesired electromagnetic inductance which can be detrimental to the operation of electrical devices to which power is supplied by the busbar assembly.

Moreover, this type of construction can be relatively time consuming in assembly and the need to manufacture specially configured metallic strengthening devices results in undesired increases in production costs.

SUMMARY OF THE INVENTION

According to a first aspect of the present invention, there is provided a support member for a busbar assembly, having a body and a receiving formation adapted to receive part of an electrical conductor, characterised in that the support member is provided with strengthening means formed from a material different from that of the body, and wherein part at least of the strengthening means is located within the body of the support member.

Preferably, substantially the whole of the strengthening means is located within the body of the support member, whereby to maintain the strengthening means insulated from the exterior of the support body.

Thus whilst the body may be formed from a non-electrically conductive material, the strengthening means may be of conductive material, being electrically insulated from the conductor by the body of the support member.

Thus, the body may comprise a plastics moulding and the strengthening means may be enveloped by the plastics material.

Whilst it will be appreciated that a variety of suitable non-electrically conductive plastics materials may be utilised, two particularly suitable materials have been found to be glass fibre filled nylon 66 and glass fibre filled PBT.

The strengthening means is preferably metallic, and conveniently is provided by metallic strip material. The metallic material is preferably non-magnetic, and stainless steel has been found to be a particularly suitable material.

By enveloping the strengthening means within the body of the support member, not only is the support member internally reinforced, thus obviating the requirement of a separate strengthening device, but the amount of thermoplastics material required to mould the body is reduced, thus reducing the associated production costs. Furthermore, by maintaining the metallic strengthening means insulated from the exterior of the support member body, the risk of cross induction occurring between the live conductors is substantially reduced, and thus that the positioning of the support member may be less critical than has previously been the case.

The invention also provides a busbar assembly having a plurality of electrical conductors and a plurality of associated support members, the support members being substantially in accordance with one or more of the preceding paragraphs.

According to a second aspect of the present invention, there is provided a method of making a support member for a busbar assembly by moulding a body of the support member from a first material, characterised in that strengthening means formed from a second, different, material is first located within the mould such that part at least of the strengthening means becomes enveloped by the first material upon moulding of the body.

Preferably, the strengthening means is wholly enveloped by the first material upon moulding of the body. Desirably, the body of the support member is moulded from a plastics material, and the strengthening means is preferably provided by a section of metallic strip material. Conveniently, the strengthening means is provided with one or more apertures therein for passage of the moulding material therethrough, whereby the strengthening means becomes securely moulded within the body of the support member. Preferably, the plastics material is glass fibre filled nylon 66 or glass fibre filled PBT, with the strengthening means preferably being provided by a section of stainless steel strip.

A further problem which is encountered with known busbar assemblies is that during their construction, a possibility exists that the nut and bolt arrangements which hold the busbars and support members together will be overtightened, which can result in excessive stresses being imparted to the assembly, and in particular to the relatively weak thermoplastics supports. As discussed above, such stresses can impair the reliability of the components to which the excessive load has been applied, giving rise to serious safety concerns.

According to a third aspect of the present invention, there is provided a busbar assembly comprising an electrical conductor and support members therefor, the support members extending generally transversely to the longitudinal axis of the conductor, spacer members being provided between adjacent support members, characterised in that compressible means are located between the spacer members and support members to provide a cushioning effect during attachment of the spacer members and support members to each other.

Preferably, the compressible means are resilient, such that on removal of a load, the compressible means may return exactly or substantially to their pre-loaded condition.

The compressible means may be generally ring-shaped, and are conveniently provided by resilient plastics material, such as neoprene rings.

The spacer members may be provided, adjacent an end thereof, with a shoulder, and the compressible means is located, in use, between the shoulder and the associated support member.

The support members may also be provided with a shoulder, such that the compressible means, in use, are located between the respective shoulders of the spacer members and the support members.

According to a fourth aspect of the present invention, there is provided, in combination, a support member and a spacer member for a busbar assembly, the support member having a body with a passage extending therethrough, the spacer member having a main part and an engagement part, the engagement part being adapted to extend through the passage in the support member, characterised in that the engagement part has a smaller cross-sectional area than the main part such that the main part cannot pass through the passage in the support member.

Preferably, the support member and spacer member are provided with shoulders which face towards each other during attachment of the support member and spacer member to each other.

Conveniently, the shoulders define a space between the support member and spacer member, the space being effective to receive compressible means to provide a cushioning effect during attachment of the support member and spacer member to each other.

The compressible means may be resilient, preferably having a shore hardness in the range 40 to 60, although materials having a shore hardness in the range 20 to 90 may be used. Thus a resilient plastics material may be utilised, conveniently in the form of an annular member such as a butyl rubber ring.

Part of the spacer member may be internally threaded, with the thread preferably extending only part-way along the engagement part.

The invention will now be described by way of example only by reference to the accompanying drawings, wherein:

DETAILED DESCRIPTION OF THE ILLUSTRATED EMBODIMENTS

Figure 1:
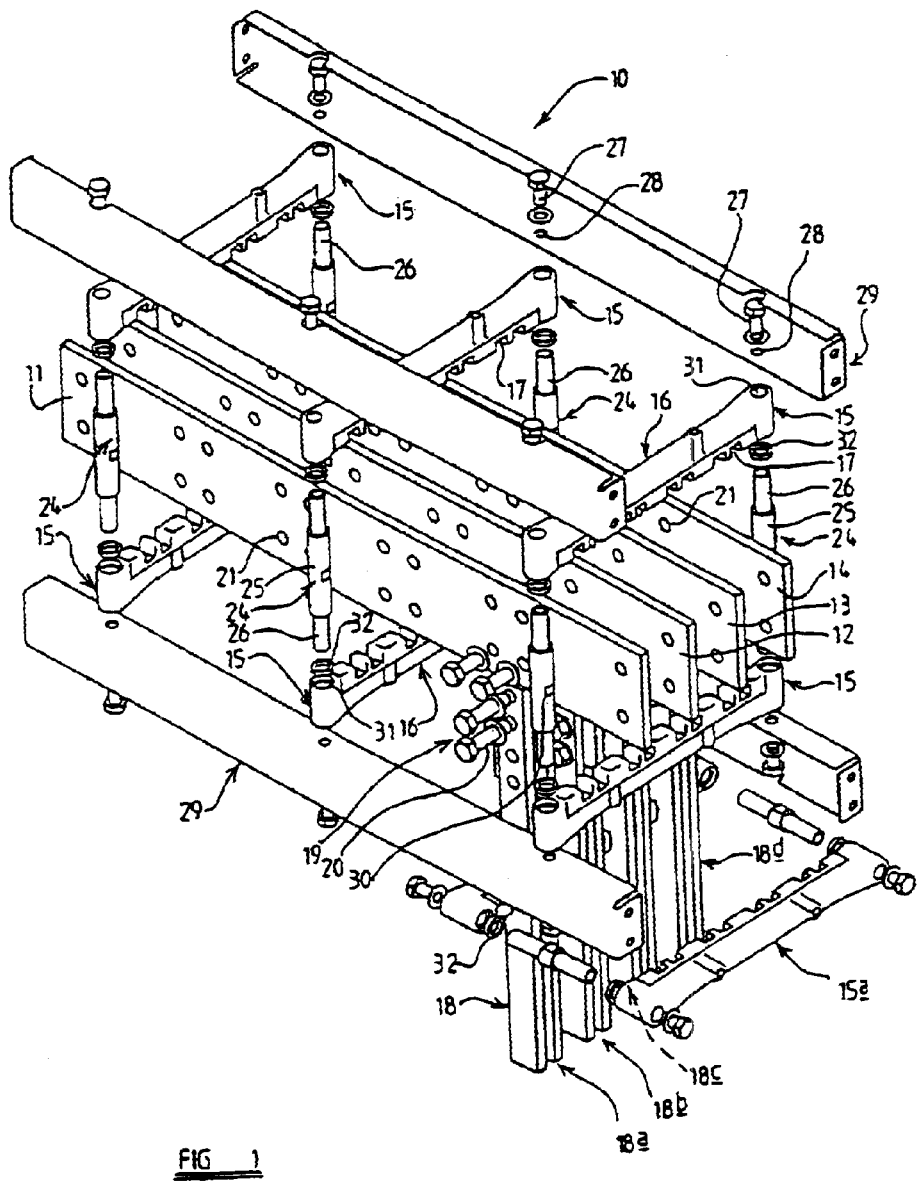
FIG. 1 is a perspective, exploded view of a busbar assembly.
Figure 2:
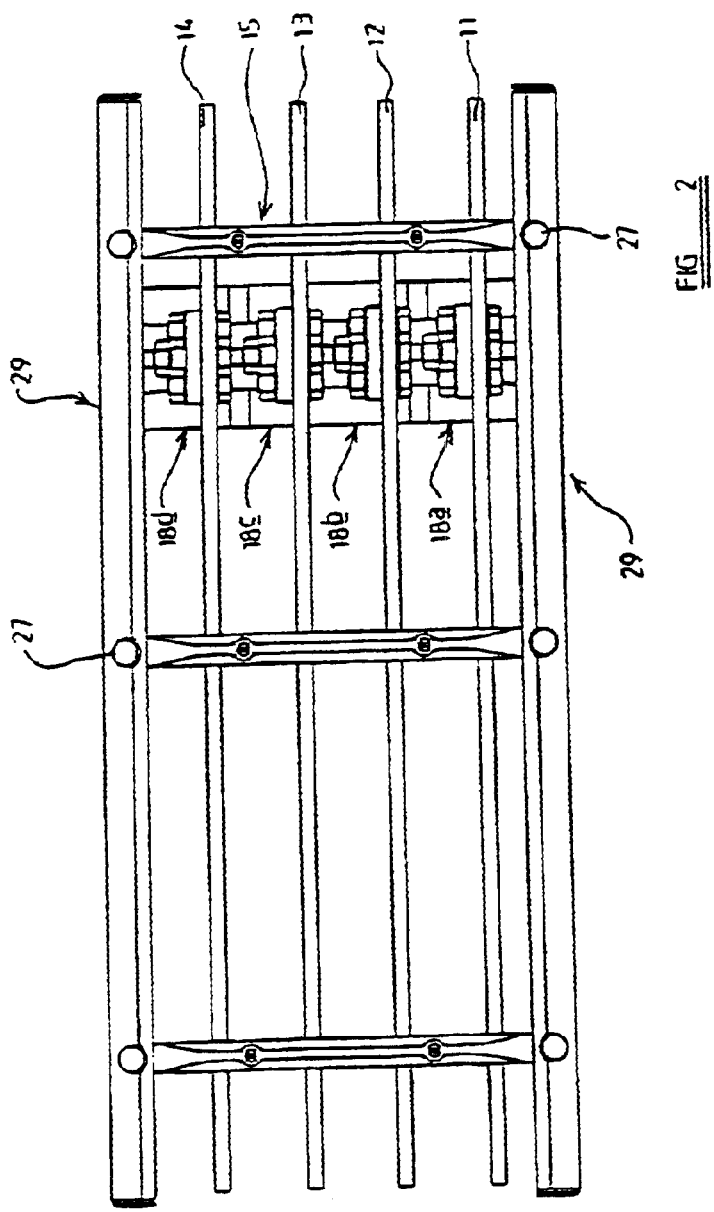
FIG. 2 is a plan view of part of a busbar assembly.
Figure 3:
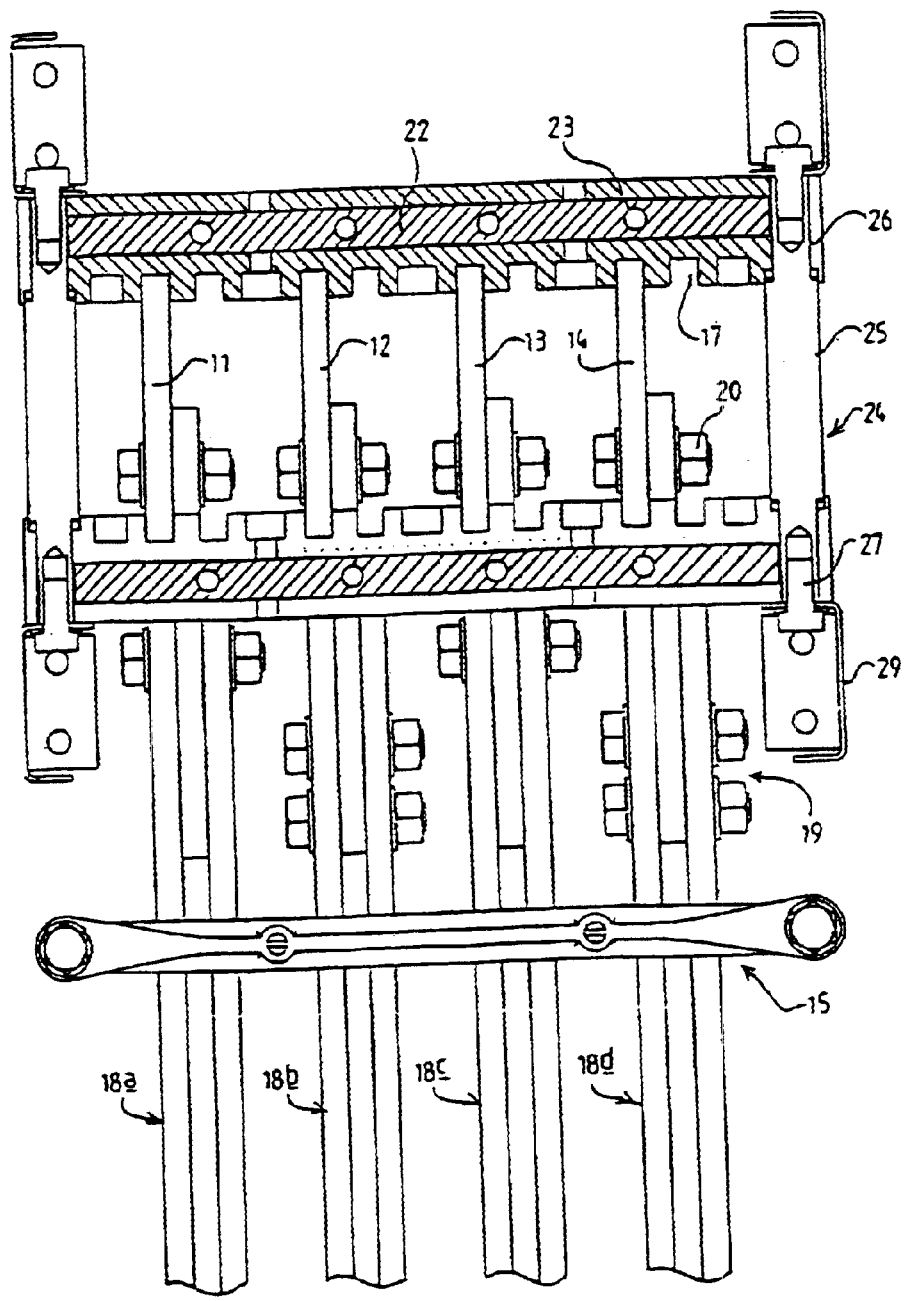
FIG. 3 is an end-on view of the assembly of FIG. 1, in assembled form.

Referring first to FIG. 1, there is shown, in part-exploded form, a busbar assembly 10 having three live current carrying busbars 11, 12 and 13 and a neutral busbar 14, and a number of support members 15 disposed above and below the busbars 11–14.

The busbars are conventional, in that they are provided by apertured metallic strips, with the support members 15 each having a body 16 and a plurality of receiving formations 17 in the form of an arrangement of channels, in which the busbar conductors may rest.

Whilst in this example, four busbars are shown, each support member is provided with eight channels 17, to enable the support members (see 15a) to engage with pairs of additional conductors 18, of which 18a, 18b and 18c carry the inbound three phase current, with conductor 18d acting as the return neutral conductor.

In generally conventional manner, the conductors 18a–18d are attached to the busbars 11–14 by means of nut and bolt arrangements generally indicated at 19, with the bolts 20 passing through apertures 21 provided in the busbars 11–14.

Figure 6:
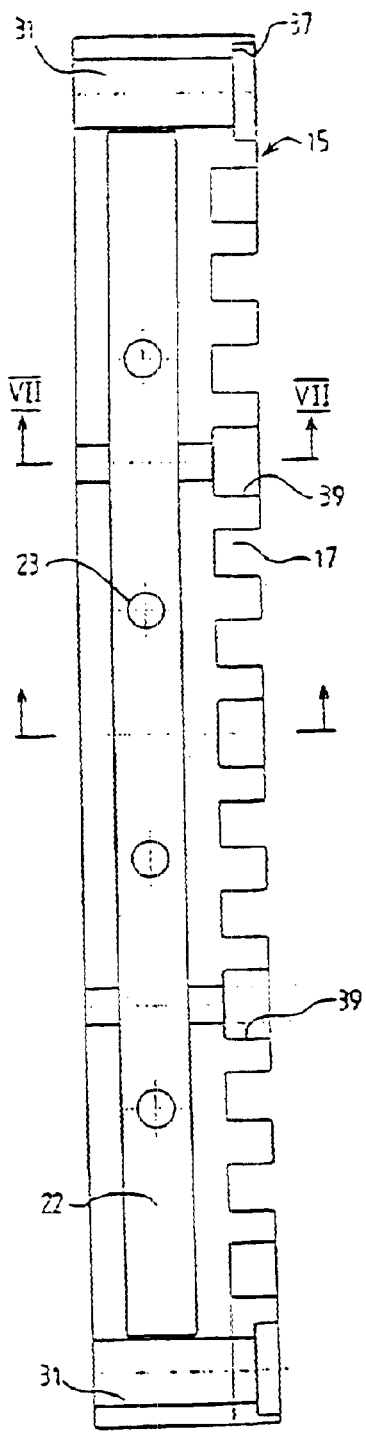

The support members 15 are moulded in thermo-plastics insulative material such as glass fibre filled nylon 66, and, as shown in FIG. 6, comprise an internal strengthening means in the form of a stainless steel strip insert 22, which is provided with a plurality of apertures 23 (in this case four) for passage of the moulding material therethrough, to enable the strengthening means to become surely moulded within the body.

The assembly further comprises a number of steel spacer members 24, each of which has a generally cylindrical main part 25 and tubular end parts 26, the end parts 26 having a smaller diameter than the main parts 25. The end parts 26 are internally threaded, to allow engagement with bolts 27 which attach metal frame members 29 to the assembly.

The spacer members 24, which are provided on their main parts 25 with one or more "flats" 30 to facilitate engagement with a tool such as a spanner, are slidably engageable within passages 31 extending through widened ends of the support members 15, the end parts 26 being just long enough to extend through the apertures 31, on compression of resilient rings 32 which in use rest on shoulders 33 of the spacer members 24.

Figure 4:
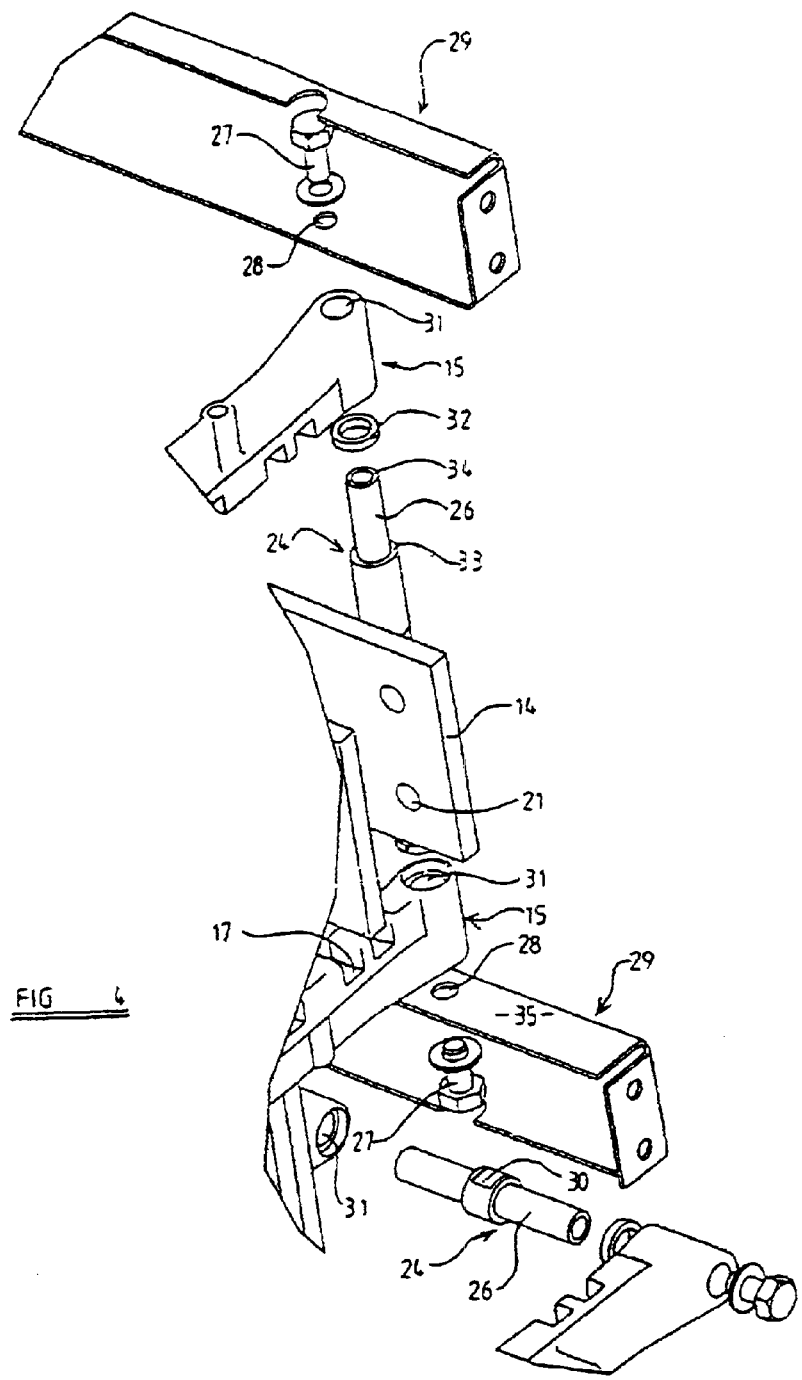
FIG. 4 is a close-up view of the right hand side of FIG. 1, showing the inter-engagement of various components.

As can been seen especially from FIG. 4, whilst the end parts 26 may slide within apertures 31 provided in the support members 15, the diameter of the end parts 26 is too great to allow passage through apertures 28 in the frame members 29. Thus, contact of the distal parts 34 of the tubular parts 26 with the facing surface 35 of the frame member 29 limits the degree of tightening of the bolt 27, and prevents any undue clamping force being imparted to the relatively weak thermoplastics support member 15.

Figure 5:
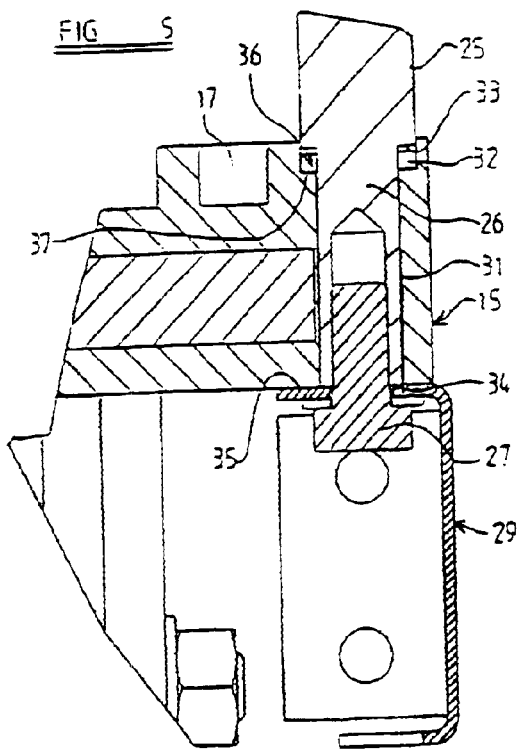
FIG. 5 is a cross-section view of the support member and spacer member of FIG. 3.
Figure 7:
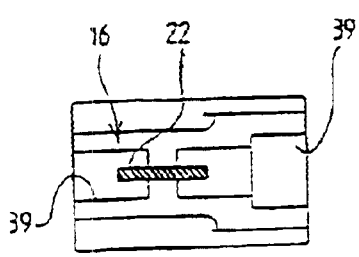
FIG. 6 is a schematic side view of the support member and FIG. 7 is a section along the line VII—VII of FIG. 6.

This tightening limit is shown in close up in FIG. 5, from which it can been seen that at the limit of travel of the bolt 27 (i.e. when the distal end 34 of the tubular end part 26 bears upon the facing surface 35 of the frame member 29)

the ring 32 is partially compressed in a space 36 defined by shoulder 33 of the spacer member 24 and opposing shoulder 37 provided by the stepped passage 31 provided in the support member 15.

Conveniently used for the resilient ring 32 are relatively soft materials such as polypropylene, butyl rubber or the like.

Thus, whilst the maximum tightening which may be effected is limited by the engagement of the tubular end part 26 and the metallic frame member 29, the later stages of tightening are cushioned to some extent by the compressible ring 32 which is located in the path of the spacer member 24. Thus, any excessive shock or damage to the frame member 29, which might occur, for example, if a powered tool were used to rotate the bolt 27, is avoided or at least substantially reduced, meaning that potentially dangerous over tightening (and hence stresses and distortions in the overall assembly) is far less likely to occur.

Bores 37 which are provided in the support body are in consequence of the use of location elements provided in the moulds, which locate the reinforcing insert 22 in the mould cavity prior to injection of plastics materials. Whilst such bores inevitably expose parts of the insert 22, these are in positions having no consequence to the functioning of the insert, or maintenance of adequate insulation thereof from the busbars.

In the present specification "comprise" means "includes or consists of" and "comprising" means "including or consisting of".

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A support member for a busbar assembly, the support member comprising a body and a receiving formation adapted to receive part of an electrical conductor, wherein the support member includes strengthening means formed from a material different from that of the body and wherein the whole of the strengthening means is located within the body of the support member.

2. A support member according to claim 1 wherein the body is formed from a non-electrically conductive material and the strengthening means is an electrically conductive material, the strengthening means being electrically insulated from the conductor by the body of the support member.

3. A support member according to claim 2 wherein the body comprises a plastic moulding that envelops the strengthening means.

4. A support member according to claim 2 wherein the strengthening means comprises a metallic strip material.

5. A support member according to claim 2 wherein the strengthening means is non-magnetic.

6. A method of making a support member for a busbar assembly comprising moulding a body of the support member from a first material, wherein strengthening means formed from a second, different, material is first located within a mould used for moulding the support member such that part of the strengthening means becomes enveloped by the first material upon moulding of the body.

7. A method of making a support member for a busbar assembly by moulding a body of the support member from a first material, characterised in that strengthening means formed from a second, different, material is first located within the mould such that part of the strengthening means becomes enveloped by the first material upon moulding of the body.

8. A method according to claim 7 wherein the body is moulded from a plastics material and wherein the strengthening means comprises a metallic strip material.

9. A method according to claim 7 wherein the strengthening means is non-magnetic.

10. A busbar assembly comprising an electrical conductor and support members therefor, the support members extending generally transverse to the longitudinal axis of the conductor, spacer members being provided that extend longitudinally between adjacent support members, wherein compressible means are located between the spacer members and support members along axis defined by the longitudinally extending spacer members, wherein the compressible means contact the spacer members.

11. A busbar assembly comprising an electrical conductor and support members therefore, the support members extending generally transverse to the longitudinal axis of the conductor, spacer members being provided between adjacent support members, characterised in that compressible means are located between the spacer members and support members.

12. A busbar assembly according to claim 10 wherein the compressible means are generally ring-shaped.

13. A busbar assembly according to claim 10 wherein the compressible means is of a material having a shore hardness between about 20 and about 90.

14. A busbar assembly according to claim 10 wherein the spacer members are provided adjacent an end thereof with a shoulder, and wherein the compressible means are located, in use, between the shoulder and the associated support member.

15. A busbar assembly according to claim 14 wherein the support members include a shoulder and wherein the compressible means are located, in use, between the respective shoulders of the spacer members and the support members.

16. A support structure for a busbar assembly, comprising a support member having a body with a passage extending therethrough, a spacer member having a main part and an engagement part, the engagement part being adapted to extend through the passage in the support member, the engagement part having a smaller cross-sectional area than the main part such that the main part is not able to extend through the passage in the support member, the support member and spacer member are provided with shoulders which face towards each other during attachment of the support member and spacer member to each other.

17. The support structure of claim 16 wherein the shoulders define a space configured to receive compressible means to provide a cushioning effect during attachment of the spacer member and support member to each other.

18. The support structure pf claim 17 wherein the compressible means is resilient.

19. The support structure of claim 16 wherein part of the spacer member is internally threaded.

20. The support structure of claim 19 wherein the internal thread extends only part-way along the engagement part.

21. A support member for a busbar assembly, the support member comprising:
- a body formed of an electrically insulative material;
- at least one receiving formation in the body and configured to receive an electrical conductor; and
- a strengthening insert located entirely within the body to electrically insulate the strengthening insert from the electrical conductor, the strengthening insert comprising a material different from the electrically insulative material of the body.

22. The support member of claim 21 wherein the electrical conductor comprises a plurality of electrical conductors and wherein the at least one receiving formation comprises a plurality of channels configured to receive ones of the plurality of electrical conductors.

23. The support member of claim 21 wherein the strengthening insert comprises a metallic strip and wherein the body comprises an electrically insulative material.

24. The support member of claim 23 wherein the metallic strip is moulded into the electrically insulative material of the body and wherein the metallic strip includes a plurality of apertures configured to receive the electrically insulative material of the body during moulding.

25. A busbar assembly comprising:
- an electrical conductor;
- a plurality of support members extending generally transversely to a longitudinal axis of the electrical conductor;
- at least one spacer member coupled between adjacent ones of the plurality of support members; and
- a resilient member positioned between at least one of the support members and a spacer member coupled thereto.

26. The busbar assembly of claim 25 wherein the support members comprise:
- a body formed of an electrically insulative material;
- at least one receiving formation in the body and configured to receive the electrical conductor, and
- a strengthening insert located substantially entirely within the body to electrically insulate the strengthening insert from the electrical conductor, the strengthening insert comprising a material different from the electrically insulative material of the body.

27. A support member for a busbar assembly, the support member comprising:
- a body formed of an electrically insulative material;
- at least one receiving formation in the body and configured to receive an electrical conductor; and
- a strengthening insert at least partially moulded into the electrically insulative material of the body to electrically insulate the strengthening insert from the electrical conductor, the strengthening insert comprising a material different from the electrically insulative material of the body.

28. The support member of claim 27 wherein the strengthening insert comprises a metallic strip that includes a plurality of apertures configured to receive the electrically insulative material of the body during moulding.

29. A busbar assembly comprising:
- an electrical conductor;
- a plurality of support members extending generally transversely to a longitudinal axis of the electrical conductor;
- at least one spacer member coupled between adjacent ones of the plurality of support members; and
- a resilient member positioned between at least one of the support members and a spacer member coupled thereto;
- wherein the support members comprise:
  - a body formed of an electrically insulative material;
  - at least one receiving formation in the body and configured to receive the electrical conductor; and
  - a strengthening insert located at least partially within the body to electrically insulate the strengthening insert from the electrical conductor, the strengthening insert comprising a material different from the electrically insulative material of the body.

* * * * *

UNITED STATES PATENT AND TRADEMARK OFFICE
CERTIFICATE OF CORRECTION

PATENT NO. : 6,664,478 B2 Page 1 of 1
DATED : December 16, 2003
INVENTOR(S) : Mohan et al.

It is certified that error appears in the above-identified patent and that said Letters Patent is hereby corrected as shown below:

Column 6,
Line 66, should read -- 18. The support structure of claim 17 wherein the compressible --

Signed and Sealed this

First Day of June, 2004

JON W. DUDAS
*Acting Director of the United States Patent and Trademark Office*